US012781354B2

(12) United States Patent
Foit et al.

(10) Patent No.: US 12,781,354 B2
(45) Date of Patent: Nov. 3, 2026

(54) PRODUCTION OF A SYNTHESIS GAS COMPRISING CARBON MONOXIDE AND HYDROGEN

(71) Applicant: Forschungszentrum Jülich GmbH, Jülich (DE)

(72) Inventors: Severin Foit, Linnich (DE); L.G.J De Haart, EA Vaals (NL); Rüdiger-A. Eichel, Jülich (DE)

(73) Assignee: Forschungszentrum Jülich GmbH, Jülich (DE)

( * ) Notice: Subject to any disclaimer, the term of this patent is extended or adjusted under 35 U.S.C. 154(b) by 1215 days.

(21) Appl. No.: 17/767,972

(22) PCT Filed: Oct. 7, 2020

(86) PCT No.: PCT/EP2020/078130
§ 371 (c)(1),
(2) Date: Apr. 11, 2022

(87) PCT Pub. No.: WO2021/078517
PCT Pub. Date: Apr. 29, 2021

(65) Prior Publication Data
US 2024/0102181 A1 Mar. 28, 2024

(30) Foreign Application Priority Data
Oct. 25, 2019 (DE) ......................... 102019128934.3

(51) Int. Cl.
*C25B 1/23* (2021.01)
*C25B 9/17* (2021.01)
(Continued)

(52) U.S. Cl.
CPC .................. *C25B 1/23* (2021.01); *C25B 9/17* (2021.01); *C25B 9/70* (2021.01); *C25B 15/08* (2013.01);
(Continued)

(58) Field of Classification Search
CPC .... C25B 1/23; C25B 9/17; C25B 9/70; C25B 15/08; C25B 1/042; C25B 1/04;
(Continued)

(56) References Cited

U.S. PATENT DOCUMENTS

2006/0000352 A1* 1/2006 Tower .................... B01D 53/04 423/210
2015/0376801 A1 12/2015 Bairamijamal
(Continued)

FOREIGN PATENT DOCUMENTS

CN 109921060 A 6/2019
EP 3511441 A1 * 7/2019
(Continued)

OTHER PUBLICATIONS

Machine translation of EP-3511441-A1.*
(Continued)

*Primary Examiner* — Bryan D. Ripa
(74) *Attorney, Agent, or Firm* — Young Basile Hanlon & MacFarlane, P.C.

(57) ABSTRACT

A method for producing a synthesis gas including carbon monoxide and hydrogen comprises a number of steps. In particular, the method comprises:
a) providing a feedstock gas comprising methane and carbon dioxide,
b) converting the feedstock gas into an intermediate product gas comprising carbon dioxide and water vapor and
c) converting the intermediate product gas obtained in step b) into the synthesis gas comprising carbon monoxide and hydrogen by means of electrolysis.
The synthesis gas including carbon monoxide and hydrogen can be obtained from biogas with particularly high efficiency by means of the described method and an appropriate
(Continued)

Figure 1:
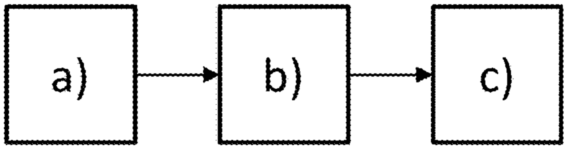

apparatus. To this end, the conversion of the biogas in a fuel cell is coupled with co-electrolysis in an electrolysis cell.

10 Claims, 1 Drawing Sheet

(51) Int. Cl.

| | |
|---|---|
| ***C25B 9/70*** | (2021.01) |
| ***C25B 15/08*** | (2006.01) |
| ***H01M 8/0662*** | (2016.01) |
| ***H01M 8/12*** | (2016.01) |
| ***H01M 8/1246*** | (2016.01) |

(52) U.S. Cl.
CPC ....... *H01M 8/0681* (2013.01); *H01M 8/1246* (2013.01); *H01M 2008/1293* (2013.01)

(58) Field of Classification Search
CPC ............. H01M 8/0681; H01M 8/1246; H01M 2008/1293; H01M 8/0668; Y02E 60/50; Y02P 20/133; Y02P 30/00; Y02P 70/50
See application file for complete search history.

(56) References Cited

U.S. PATENT DOCUMENTS

2018/0112142 A1* 4/2018 Foody ..................... C10L 3/105
2020/0024204 A1* 1/2020 Hammond .............. C05C 11/00
2020/0153013 A1* 5/2020 Herrmann ........... H01M 8/0637

FOREIGN PATENT DOCUMENTS

GB 2568564 A 5/2019
WO 2018069503 A2 4/2018

OTHER PUBLICATIONS

"High Temperature Solid Oxide H2O/CO2 Co-Electrolysis for Syngas Production" by Wang et al., Fuel Processing Tech. 161, pp. 248-258 (2017).*
"Solid Oxide Fuel Cells Fuelled with Biogas: Potential and Constraints" by Saadabadi et al., Renewable Energy 134, pp. 194-214 (2019).*
Zhongliang Zhan et al: "Syngas Production by Colectrolysis of CO2/H20: The Basis for a Renewable Energy Cycle", Energy and Fuels, Bd. 23, Nr. 6, 18. (Jun. 18, 2009).
International Seach Report, Apr. 12, 2020, 4 Pages.
Chinese Office Action, dated Dec. 11, 2023 (5 pages).

* cited by examiner

PRODUCTION OF A SYNTHESIS GAS COMPRISING CARBON MONOXIDE AND HYDROGEN

CROSS REFERENCE TO RELATED APPLICATIONS

This application is a U.S. national stage application of International Application no. PCT/EP2020/078130, filed Oct. 7, 2020, which claims the benefit of the filing date of German Application No. 10 2019 128 934.3, filed Oct. 25, 2019, the contents of which are hereby incorporated by reference in their entirety.

The present invention relates to a method and an apparatus for production of a synthesis gas comprising carbon monoxide and hydrogen.

A synthesis gas comprising carbon monoxide and hydrogen contains the elements carbon, oxygen and hydrogen, which are necessary for the production of important organic chemicals. This synthesis gas is therefore suitable for many petrochemical processes, for example for the production of synthetic fuel, natural gas, methanol or formaldehyde. This synthesis gas is therefore suitable for replacing fossil-based raw materials. This can make an important contribution to the energy transition. In particular, synthetic fuel can be used to drive motor vehicles in an environmentally friendly manner without extensive changes to the design of the motor vehicles being required.

There is therefore a need to produce synthesis gas comprising carbon monoxide and hydrogen. Methods for this are known from the prior art. In particular, the synthesis gas can be obtained from gaseous carbon dioxide and water vapor when energy is supplied by means of electrolysis. This process is known as “co-electrolysis.” This is part of the “Power-to-X” concept, where a chemical (“X”) is obtained from energy (“Power”). By using climate-damaging carbon dioxide as a starting material and using renewable energy, this concept can contribute to reducing global warming.

Known processes for the production of synthesis gas by means of co-electrolysis have low efficiency, in particular because water has to be evaporated for these processes.

Proceeding from this, the present invention is based on the object of at least partly overcoming the problems known from the prior art and, in particular, to present a method and an apparatus for the production of a synthesis gas comprising carbon monoxide and hydrogen, with which method and apparatus improved efficiency can be achieved.

These objects are achieved with the features of the independent claims. Further advantageous embodiments of the invention are specified in the dependently formulated claims. The features listed individually in the dependently formulated claims can be combined with one another in a technologically meaningful manner and can define further embodiments of the invention. In addition, the features specified in the claims are described and explained in more detail in the description, further preferred embodiments of the invention being thereby shown.

According to the invention, a method for production of a synthesis gas comprising carbon monoxide and hydrogen is presented. The method comprises:

a) providing a feedstock gas comprising methane and carbon dioxide, b) converting the feedstock gas into an intermediate product gas comprising carbon dioxide and water vapor and c) converting the intermediate product gas obtained in step b) into the synthesis gas comprising carbon monoxide and hydrogen by means of electrolysis.

A synthesis gas containing carbon monoxide and hydrogen can be produced by means of the described method. This synthesis gas is suitable for many petrochemical processes, for example for the production of synthetic fuel, natural gas, methanol or formaldehyde. The method described is part of the “Power-to-X” concept.

In the method described, the synthesis gas is obtained from carbon dioxide and water vapor by means of electrolysis (step c)). In the method described, the starting materials for the electrolysis (carbon dioxide and water vapor) are formed as an intermediate product from a feedstock gas comprising methane and carbon dioxide (step b)).

In the method described, two chemical processes are coupled with one another: on the one hand, the intermediate product gas is obtained from the feedstock gas (step b)). On the other hand, the synthesis gas is produced from the intermediate product gas (step c)). These two processes are coupled with one another in that the product of the first process (the intermediate product gas comprising carbon dioxide and water vapor) is used as a starting material for the second process. Particularly high efficiency can thereby be achieved, in particular because the intermediate product gas contains water vapor. It is therefore not necessary to evaporate water for the electrolysis.

Steps b) and c) of the method described are preferably carried out at a temperature within the range from 700 to 900° C. To this end, the feedstock gas is preferably provided at this temperature in step a) or is heated or cooled to this temperature. During the implementation of steps b) and c), the temperature is preferably kept within the range from 750 and 850° C.

In step a), the feedstock gas is provided. The feedstock gas comprises methane and carbon dioxide. In addition, the feedstock gas can comprise other components, for example water vapor. The feedstock gas preferably has a methane content of at least 30%, in particular at least 50%. The feedstock gas preferably has a carbon dioxide content of at least 15%, in particular at least 30%. The combination of the feedstock gas having a methane content of at least 50% and a carbon dioxide content of at least 30% is preferred.

In step b), the feedstock gas is converted to the intermediate product gas comprising carbon dioxide and water vapor. This is preferably done in a fuel cell. The fuel gas is supplied to the fuel cell with the feedstock gas.

The fuel cell preferably has an anode and a cathode, which are separated from one another at least by an electrolyte. Furthermore, the fuel cell preferably has an anode space that is adjacent to the anode such that a gas can flow along the anode through the anode space. Furthermore, the fuel cell preferably has a cathode space that is adjacent to the cathode such that a gas can flow along the cathode through the cathode space.

The feedstock gas is preferably introduced into the anode space of the fuel cell. Oxygen is preferably provided at the cathode of the fuel cell. To this end, for example, oxygen, air or a mixture of nitrogen and oxygen can be introduced into the cathode space.

The oxygen can be reduced at the cathode:

$$O_2+4e^-\rightarrow 2O^{2-}(g) \quad (1)$$

Based on this reaction equation, one molecule of gaseous oxygen ($O_2$) is converted to two oxygen ions ($O^{2-}$) by taking up four electrons ($e^-$).

The electrolyte is preferably permeable to oxygen ions ($O^{2-}$), but not to gas molecules such as $CO_2$, CO, $H_2O$ or $H_2$. The oxygen ions ($O^{2-}$) can therefore get from the cathode space into the anode space. As a result, the methane from the feedstock gas can be converted to the intermediate product gas at the anode:

$$CH_4(g)+4O^{2-}\rightarrow 2H_2O(g)+CO_2(g)+8e^- \quad (2)$$

Based on this reaction equation, one molecule of gaseous methane ($CH_4$) is reacted with four oxygen ions ($O^{2-}$) to form two water vapor molecules ($H_2O$) and one gaseous molecule of carbon dioxide ($CO_2$), eight electrons ($e^-$) being released.

For the fuel cell, the reaction equations (1) and (2) result in the following balancing equation, reaction equation (1) being taken into account twice:

$$CH_4(g)+2O_2\rightarrow 2H_2O(g)+CO_2(g) \quad (3)$$

On the right side of this balancing equation are the water vapor and carbon dioxide components of the intermediate product gas. The intermediate product gas preferably consists exclusively of these components.

The fuel cell generates electrical energy that can be tapped at the cathode and the anode of the fuel cell.

In step c), the intermediate product gas (comprising carbon dioxide and water vapor) is converted to the synthesis gas (comprising carbon monoxide and hydrogen) by means of electrolysis. This takes place in an electrolysis cell, in particular of the co-electrolysis type. The electrolysis cell preferably has an anode and a cathode, which are separated from one another at least by an electrolyte. In addition to the electrolyte, further layers can be arranged between the anode and the cathode. Preferably, the electrolysis cell is substrate-supported or electrolyte-supported. As the substrate-supported configuration, it is preferable for the cathode to be formed as a Ni-YSZ electrode, the electrolyte to be formed from YSZ, a barrier layer of CGO to be interposed between the electrolyte and the anode, and the anode to be formed from LSC. Alternatively, as an electrolyte-supported configuration, it is preferable for the cathode to be formed as a Ni-CGO electrode, the electrolyte to be formed from YSZ, a barrier layer of CGO to be interposed between the electrolyte and the anode, and the anode to be formed from LSCF.

Furthermore, the electrolysis cell preferably has an anode space that adjoins the anode. A gas can flow along the anode in the anode space. Furthermore, the electrolysis cell preferably has a cathode space that adjoins the cathode. A gas can flow along the cathode in the cathode space. The anode space and/or cathode space preferably each have an inlet and an outlet.

The intermediate product gas comprising carbon dioxide and water vapor is preferably introduced in the gaseous state via the inlet of the cathode space of the electrolysis cell into the cathode space of the electrolysis cell such that the feedstock gas can flow along the cathode of the electrolysis cell. If an electric current is applied between the anode and cathode of the electrolysis cell, the carbon dioxide from the feedstock gas is reduced at the cathode of the electrolysis cell according to the following chemical equations:

$$CO_2(g)+2e^-\rightarrow CO(g)+O^{2-} \quad (4)$$

Based on this reaction equation, a molecule of gaseous carbon dioxide ($CO_2$) is converted to a molecule of gaseous carbon monoxide (CO) and an oxygen ion ($O^{2-}$) by taking up two electrons ($e^-$).

In addition, the water vapor from the feedstock gas is reduced at the cathode based on the following chemical equations:

$$H_2O(g)+2e^-\rightarrow H_2(g)+O^{2-} \quad (5)$$

Based on this reaction equation, a water vapor molecule ($H_2O$) is converted to a molecule of gaseous hydrogen ($H_2$) and an oxygen ion ($O^{2-}$) by taking up two electrons ($e^-$).

The electrolyte is preferably permeable to oxygen ions ($O^{2-}$), but not to gas molecules such as $CO_2$, CO, $H_2O$ or $H_2$. The oxygen ions ($O^{2-}$) can therefore get from the cathode space into the anode space. The following oxidation reaction can take place there:

$$2O^{2-}\rightarrow O_2(g)+4e^- \quad (6)$$

Based on this reaction equation, two oxygen ions ($O^{2-}$) are converted to a molecule of gaseous oxygen ($O_2$), four electrons ($e^-$) being released.

Electrons can be moved from the anode to the cathode via a voltage source. Equations (4), (5) and (6) therefore result in the following balancing equation for the electrolysis cell:

$$H_2O+CO_2\rightarrow H_2+CO+O_2 \quad (7)$$

A synthesis gas comprising hydrogen and carbon monoxide can therefore be obtained from water vapor and carbon dioxide by supplying energy by means of the electrolysis cell. Said synthesis gas is formed at the cathode of the electrolysis cell and can be discharged via an outlet in the cathode space of the electrolysis cell.

Furthermore, oxygen is formed in the anode space of the electrolysis cell, which oxygen can be discharged via the outlet of the anode space of the electrolysis cell. The synthesis gas and the oxygen can therefore be obtained separately from one another.

The following chemical reaction can take place in the cathode space of the electrolysis cell:

$$H_2O(g)+CO(g)\rightleftharpoons H_2(g)+CO_2(g) \quad (8)$$

This reaction, also known as the "reversible water gas shift," is an equilibrium reaction such that carbon dioxide and hydrogen can also react to form carbon monoxide and water. The electrolysis reduces carbon dioxide ($CO_2$) to carbon monoxide based on reaction equation (4) and water vapor ($H_2O$) to hydrogen ($H_2$) based on reaction equation (5). This changes the proportions in reaction equation (8) such that the chemical equilibrium is disturbed. This can cause the formation of water vapor ($H_2O$) and carbon monoxide (CO) from hydrogen ($H_2$) and carbon dioxide ($CO_2$). The co-electrolysis of carbon dioxide with water vapor is therefore particularly efficient because the conversion of carbon dioxide to carbon monoxide can be additionally supported with the hydrogen formed during the electrolysis.

Because of reaction equation (8), the synthesis gas can contain a proportion of gaseous carbon dioxide and/or a proportion of water vapor. It is preferred that the synthesis gas is separated into carbon monoxide and hydrogen on the one hand and into all the other substances on the other hand after exiting the outlet of the cathode space of the electrolysis cell. The other substances can primarily be carbon dioxide and/or water. The separated carbon dioxide and/or water can be returned to the electrolysis.

It is preferred that the anode space of the electrolysis cell is flushed with a flushing gas. Air, oxygen ($O_2$) and/or nitrogen ($N_2$), for example, can be considered as the flushing gas. The oxygen formed at the anode can be conducted away from the anode by the flushing gas. The partial pressure of the oxygen at the anode can therefore be lowered. As a result, the voltage to be applied between the anode and cathode for the electrolysis is lower, which means that energy can be saved. The efficiency can therefore be increased by the flushing gas. The flushing gas is preferably heated to a temperature within the range of 700 to 900° C. before being introduced into the anode space. As a result, thermal stresses within the electrolysis cell can be avoided.

According to a preferred embodiment of the method, the feedstock gas is a biogas.

Biogas is to be understood as meaning a gas obtained from biomass, in particular by means of fermentation. Biogas can be obtained in a biogas plant, for example, by decomposing biomass, i.e., organic material, in the absence of air. The biogas used here comprises methane and carbon dioxide. These two components are usually the largest components in biogas. In addition, the biogas can also comprise, for example, ammonia, oxygen, hydrogen sulfide, nitrogen, water vapor and/or hydrogen.

According to a further preferred embodiment of the method, the proportion of methane in the feedstock gas is within the range from 50 to 65% and/or the proportion of carbon dioxide in the feedstock gas is within the range from 30 to 45%.

The combination in which the proportion of methane in the feedstock gas is within the range from 50 to 65% and the proportion of carbon dioxide in the feedstock gas is within the range from 30 to 45% is preferred.

It has been found that particularly high efficiency can be achieved with such a feedstock gas.

According to a further preferred embodiment of the method, the feedstock gas also includes water vapor with a proportion within the range from 2 to 10%.

In a first example, the feedstock gas is composed of 55% methane, 40% carbon dioxide and 5% water vapor. In step b), this can result in an intermediate product gas consisting of 45% carbon dioxide and 55% water vapor. In step c), a synthesis gas consisting of 45% carbon monoxide and 55% hydrogen can be obtained therefrom.

In a second example, the feedstock gas is composed of 60% methane, 35% carbon dioxide and 5% water vapor. In step b), this can result in an intermediate product gas consisting of 43% carbon dioxide and 57% water vapor. In step c), a synthesis gas consisting of 43% carbon monoxide and 57% hydrogen can be obtained therefrom.

The two examples show that the composition of the synthesis gas can be influenced by the composition of the feedstock gas. If a biogas having a predetermined composition is used, a corresponding synthesis gas can be produced therefrom using the method described. If the composition of said synthesis gas does not correspond to the desired composition, additional carbon monoxide or additional hydrogen, for example, can be added to the synthesis gas. As a result, a synthesis gas having the same desired composition can be obtained continuously despite changes in the composition of the biogas. Alternatively, the composition of the feedstock gas can be kept constant by adding appropriate components.

According to a further preferred embodiment of the method, step b) is carried out in a solid oxide fuel cell (SOFC).

An SOFC cell is a fuel cell having a solid electrolyte, for example made of an oxide ceramic such as YSZ. The cathode consists of LSM, for example. The anode is in the form of a Ni-YSZ electrode, for example. An SOFC cell is preferably operated at a temperature within the range from 650 to 1000° C. For the method described, the SOFC cell is preferably operated at the same temperature as the electrolysis cell, in particular within the range from 700 to 850° C. As a result, thermal stresses due to temperature differences can be avoided.

It has been found that particularly high efficiency can be achieved with a SOFC cell.

According to a further preferred embodiment of the method, electrical energy generated in step b) is used for the electrolysis in step c).

As described, two chemical processes are coupled with one another in the method described: on the one hand, converting the feedstock gas to the intermediate product gas and, on the other hand, converting the intermediate product gas to the synthesis gas. In the present embodiment, the two processes are further coupled with one another in that electrical energy generated in the first process is used in the second process.

The fact that electrical energy generated in step b) is used for the electrolysis in step c) does not mean that only the electrical energy generated in step b) is used for the electrolysis in step c). In tests, the electrical energy generated in step b) was able to cover about a third of the energy requirement for the electrolysis. Preferably, but not necessarily, all of the energy generated in step b) is used for the electrolysis in step c). This applies in any case except for unavoidable losses.

The electrical coupling of the two processes reduces the need for electrical energy from external sources. In this respect, the efficiency of the method can be increased.

As a further aspect of the invention, an apparatus for production of a synthesis gas comprising carbon monoxide and hydrogen is presented. The apparatus includes:

- a fuel cell having an anode and a cathode, which are separated from one another at least by an electrolyte, and an anode space adjoining the anode and
- an electrolysis cell having an anode and a cathode, which are separated from one another at least by an electrolyte, and a cathode space adjoining the cathode.

The anode space of the fuel cell is connected to the cathode space of the electrolysis cell.

The described special advantages and design features of the method can be used and transferred to the apparatus, and vice versa. The described method is preferably carried out using the described apparatus. The described apparatus is preferably intended and configured to carry out the described method.

In the fuel cell, the feedstock gas can be converted to the intermediate product gas comprising carbon dioxide and water vapor (step b)). In the electrolysis cell, the intermediate product gas obtained in step b) can be converted by electrolysis to the synthesis gas comprising carbon monoxide and hydrogen (step c)). For this purpose, the electrolysis cell preferably has a current and voltage source, by means of which a current can be applied between the cathode and the anode. The electrolysis cell is preferably designed as a high-temperature electrolysis cell.

In the anode space of the fuel cell, a gas can flow along the anode of the fuel cell. Furthermore, the fuel cell preferably has a cathode space that adjoins the cathode of the fuel cell. In the cathode space of the fuel cell, a gas can flow along the cathode of the fuel cell. The anode space and/or cathode space of the fuel cell preferably each have an inlet and an outlet.

In the cathode space of the electrolysis cell, a gas can flow along the cathode of the electrolysis cell. Furthermore, the electrolysis cell preferably has an anode space that adjoins the anode of the electrolysis cell. In the anode space of the electrolysis cell, a gas can flow along the anode of the electrolysis cell. The anode space and/or cathode space of the electrolysis cell preferably each have an inlet and an outlet.

The anode space of the fuel cell is connected to the cathode space of the electrolysis cell, preferably by connecting the outlet of the anode space of the fuel cell to the inlet of the cathode space of the electrolysis cell. The fuel cell and the electrolysis cell can be designed in one piece in such a way that the fuel cell transitions into the electrolysis cell without any physical separation. The outlet of the anode space of the fuel cell and the inlet of the cathode space of the electrolysis cell can be designed as a connecting line between the anode space of the fuel cell and the cathode space of the electrolysis cell. The connecting line can be formed in one piece with the anode space of the fuel cell and/or with the cathode space of the electrolysis cell.

According to a preferred embodiment of the apparatus, the fuel cell and the electrolysis cell are connected to one another in such a way that electrical energy generated with the fuel cell can be used for electrolysis in the electrolysis cell.

The connection can be formed by electrical lines, for example. In this embodiment, electrical energy generated in step b) can be used for the electrolysis in step c).

According to a further preferred embodiment of the apparatus, the anode and the cathode of the fuel cell are connected to a store for electrical energy on the input side and/or the anode and the cathode of the electrolysis cell are connected to the store for electrical energy on the output side.

In this embodiment too, electrical energy generated in step b) can be used for the electrolysis in step c). The electrical energy generated with the fuel cell can be stored in the store. The electrical energy therefore does not have to be consumed immediately after it is produced. As a result, loss of energy can be avoided and the degree of efficiency can be increased in this respect.

The store for electrical energy is preferably designed as an accumulator, i.e., as a rechargeable store for electrical energy. Electrical energy can be conducted from the fuel cell into the store and stored in the store. For this purpose, the anode and the cathode of the fuel cell are connected to the store on the input side. Energy stored in the store can be delivered to the electrolysis cell. For this purpose, the anode and the cathode of the electrolysis cell are connected to the store on the output side. The combination of the anode and the cathode of the fuel cell being connected to a store for electrical energy on the input side and the anode and the cathode of the electrolysis cell being connected to the store for electrical energy on the output side is preferred.

According to a further preferred embodiment of the apparatus, the fuel cell and the electrolysis cell are arranged together in a housing.

The fuel cell and electrolysis cell are to be considered as being arranged together in a housing if, in any case, regions of the fuel cell and the electrolysis cell in which the chemical reactions relevant to the described method take place are arranged within the housing. The housing can consist of one or more parts. The housing can have openings, in particular for supply lines through which gases can be supplied to the fuel cell and/or the electrolytic cell and/or for discharge lines through which gases can be discharged from the fuel cell and/or from the electrolysis cell.

Due to the common arrangement in a housing, particularly high efficiency can be achieved in that the fuel cell and the electrolysis cell are thermally coupled to one another. It is particularly efficient to bring the fuel cell and the electrolysis cell to the operating temperature together and to keep them there. The housing is preferably thermally insulated. There is preferably no thermal insulation between the fuel cell and the electrolysis cell.

Figure 2:
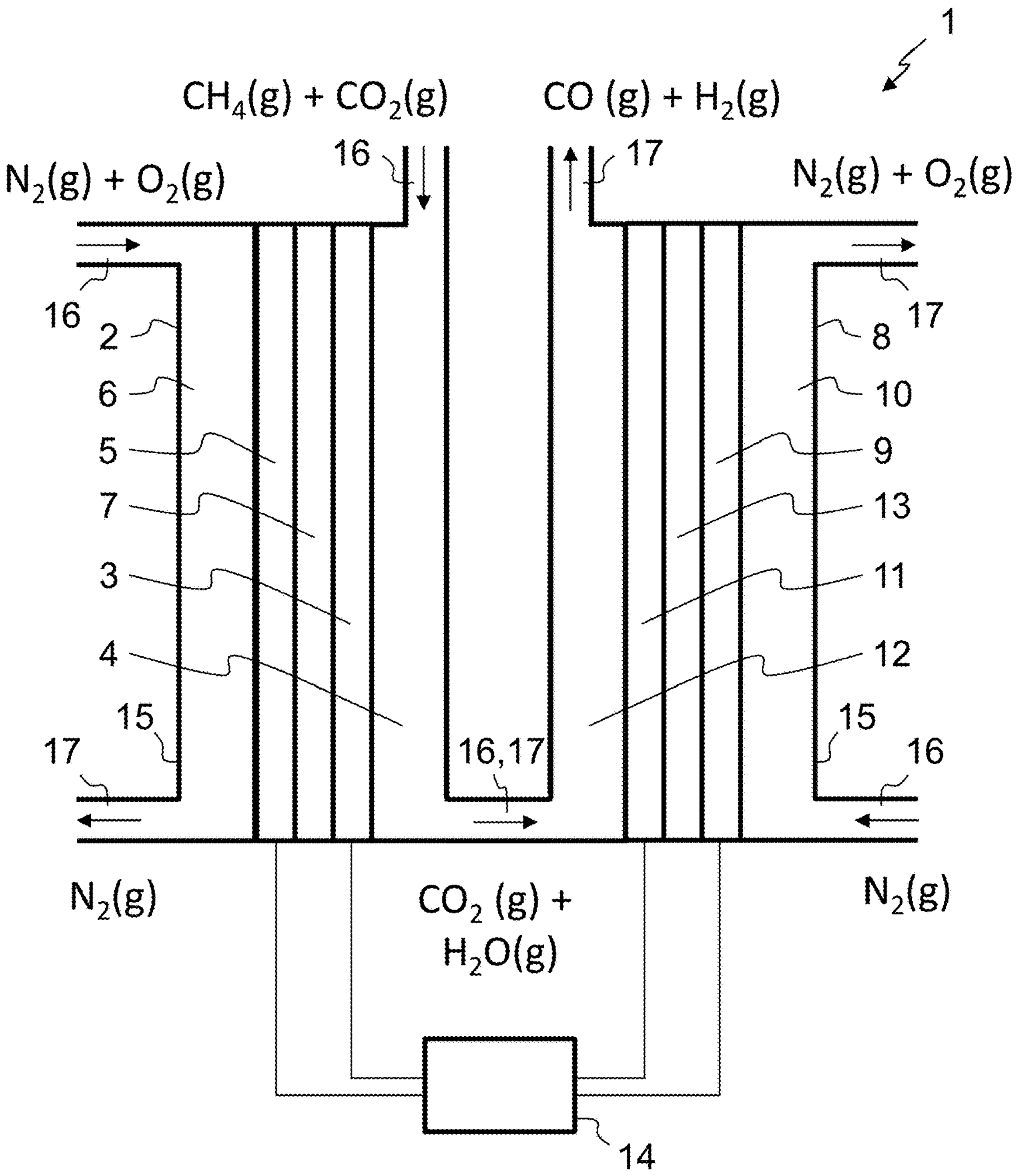

In the following, the invention and the technical environment will be explained in more detail with reference to the figures. It should be noted that the invention is not supposed to be limited by the depicted embodiments. In particular, unless explicitly stated otherwise, it is also possible to extract partial aspects from the facts described in the figures and to combine them with other components and insights from the present description and/or the figures. In particular, it must be noted that the figures and in particular the depicted size ratios are only schematic. Identical reference signs denote identical objects, so that explanations from other figures can be used in a supplementary manner, if necessary. In the drawings:

FIG. 1: is a flowchart of a method according to the invention for production of a synthesis gas comprising carbon monoxide and hydrogen, and FIG. 2: shows an apparatus according to the invention for production of a synthesis gas comprising carbon monoxide and hydrogen.

FIG. 1 shows a flowchart of a method for production of a synthesis gas comprising carbon monoxide and hydrogen. The method comprises:

a) providing a feedstock gas comprising methane and carbon dioxide, b) converting the feedstock gas into an intermediate product gas comprising carbon dioxide and water vapor and c) converting the intermediate product gas obtained in step b) into the synthesis gas comprising carbon monoxide and hydrogen by means of electrolysis.

The feedstock gas is preferably biogas having a methane content within the range from 50 to 65%, a carbon dioxide content within the range from 30 to 45% and a water vapor content within the range from 2 to 10%.

FIG. 2 shows an apparatus 1 for production of a synthesis gas comprising carbon monoxide and hydrogen. The apparatus 1 comprises a fuel cell 2 designed as an SOFC cell having an anode 3 and a cathode 5, which are separated from one another at least by an electrolyte 7, and an anode space 4 adjoining the anode 3 and a cathode space 6 adjoining the cathode 5. Step b) of the method from FIG. 1 can be carried out with the fuel cell 2. Furthermore, the apparatus 1 comprises an electrolysis cell 8 having an anode 9 and a cathode 11, which are separated from one another at least by an electrolyte 13, as well as a cathode space 12 adjoining the cathode 11 and an anode space 10 adjoining the anode 9. Step c) of the method from FIG. 1 can be carried out with the electrolysis cell 8.

The two cathode spaces 6 and 12 and the two anode spaces 4 and 10 each have an inlet 16 and an outlet 17. The anode space 4 of the fuel cell 8 is connected to the cathode space 12 of the electrolytic cell 8 in that the outlet 17 of the anode space 4 of the fuel cell 8 is connected to the inlet 16 of the cathode space 12 of the electrolysis cell 8. The feedstock gas can be introduced into the anode space 4 of the fuel cell 2 via the inlet 16 of the anode space 4 of the fuel cell 2 and can in this respect be provided according to step a) of the method from FIG. 1.

Oxygen can be introduced into the inlet 16 of the cathode space 6 of the fuel cell 2. In the embodiment shown, the oxygen is introduced together with nitrogen, which is not required. Alternatively, air can also be introduced into the inlet 16 of the cathode space 6 of the fuel cell 2. The nitrogen (or the used air) can be let out of the cathode space 6 of the fuel cell 2 at the outlet 17 of the cathode space 6 of the fuel cell 2. Unconverted oxygen can also escape from the outlet 17 of the cathode space 6 of the fuel cell 2.

A flushing gas can be introduced into the inlet 16 of the anode space 10 of the electrolysis cell 8 and can be discharged from the outlet 17 of the anode space 10 together with the oxygen formed in the anode space 10. In the embodiment shown, the flushing gas is nitrogen. Alternatively, however, oxygen in particular can also be used as the flushing gas.

The fuel cell 2 and the electrolysis cell 8 are connected to one another in such a way that electrical energy produced by the fuel cell 2 can be used for electrolysis in the electrolysis cell 8. For this purpose, the anode 3 and the cathode 5 of the fuel cell 2 are connected to a store 14 for electrical energy on the input side and the anode 9 and the cathode 11 of the electrolysis cell 8 are connected to the store 14 for electrical energy on the output side.

The fuel cell 2 and the electrolysis cell 8 are arranged together in a housing 15.

A synthesis gas comprising carbon dioxide and hydrogen can be obtained from biogas with particularly high efficiency by means of the described method and the described apparatus 1. To this end, the conversion of the biogas in a fuel cell 2 is coupled with co-electrolysis in an electrolysis cell 8.

LIST OF REFERENCE SIGNS

1 apparatus
2 fuel cell
3 anode of the fuel cell
4 anode space of the fuel cell
5 cathode of the fuel cell
6 cathode space of the fuel cell
7 electrolyte of the fuel cell
8 electrolysis cell
9 anode of the electrolysis cell
10 anode space of the electrolysis cell
11 cathode of the electrolysis cell
12 cathode space of the electrolysis cell
13 electrolyte of the electrolysis cell
14 store for electrical energy
15 housing
16 inlet
17 outlet

The invention claimed is:

1. A method for production of a synthesis gas comprising carbon monoxide and hydrogen, comprising:

a) providing a feedstock gas comprising methane and carbon dioxide, b) in a fuel cell having an anode and a cathode, which are separated from one another at least by an electrolyte, and an anode space adjoining the anode, converting the feedstock gas into an intermediate product gas comprising carbon dioxide and water vapor, and c) in an electrolysis cell having an anode and a cathode, which are separated from one another at least by an electrolyte, and a cathode space adjoining the cathode, converting the intermediate product gas obtained in step b) into the synthesis gas comprising carbon monoxide and hydrogen by means of electrolysis, wherein the anode space of the fuel cell is connected to the cathode space of the electrolysis cell, and wherein the fuel cell and the electrolysis cell are arranged together in a housing and are thermally coupled to one another.

2. The method according to claim 1, wherein the feedstock gas is a biogas.

3. The method according to claim 2, wherein the proportion of methane in the feedstock gas is within the range from 50 to 65% and/or the proportion of carbon dioxide in the feedstock gas is within the range from 30 to 45%.

4. The method according to claim 3, wherein the feedstock gas also comprises water vapor having a proportion within the range from 2 to 10%.

5. The method according to claim 4, wherein the fuel cell is a solid oxide fuel cell (SOFC).

6. The method according to claim 5, wherein electrical energy generated in step b) is used for the electrolysis in step c).

7. The method according to claim 1, wherein the proportion of methane in the feedstock gas is within the range from 50 to 65% and/or the proportion of carbon dioxide in the feedstock gas is within the range from 30 to 45%.

8. The method according to claim 1, wherein the feedstock gas also comprises water vapor having a proportion within the range from 2 to 10%.

9. The method according to claim 1, wherein the fuel cell is a solid oxide fuel cell (SOFC).

10. The method according to claim 1, wherein electrical energy generated in step b) is used for the electrolysis in step c).

* * * * *